(12) United States Patent
Umamine

(10) Patent No.: US 11,112,686 B2
(45) Date of Patent: Sep. 7, 2021

(54) LIGHT SOURCE UNIT AND PROJECTOR

(71) Applicant: CASIO COMPUTER CO., LTD., Tokyo (JP)

(72) Inventor: Osamu Umamine, Fussa (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 0 days.

(21) Appl. No.: 16/546,035

(22) Filed: Aug. 20, 2019

(65) Prior Publication Data

US 2020/0064720 A1 Feb. 27, 2020

(30) Foreign Application Priority Data

Aug. 21, 2018 (JP) .............................. JP2018-154872

(51) Int. Cl.
  *G03B 21/20* (2006.01)
  *G02B 27/14* (2006.01)
  *G02B 26/00* (2006.01)

(52) U.S. Cl.
  CPC ......... *G03B 21/204* (2013.01); *G02B 26/008* (2013.01); *G02B 27/141* (2013.01); *G03B 21/2066* (2013.01)

(58) Field of Classification Search
  CPC .. G02B 26/008; G02B 27/141; G03B 21/204; G03B 21/2066
  See application file for complete search history.

(56) References Cited

U.S. PATENT DOCUMENTS

2014/0354960 A1* 12/2014 Miyazaki ............. G02B 26/008
  353/84

FOREIGN PATENT DOCUMENTS

| CN | 104423130 A | 3/2015 |
| CN | 106597785 A | 4/2017 |
| JP | 2011-013320 A | 1/2011 |

OTHER PUBLICATIONS

CNIPA; Application No. 201910772670.8; Office Action dated Jan. 5, 2021.

\* cited by examiner

*Primary Examiner* — Joseph L Williams
(74) *Attorney, Agent, or Firm* — Fitch, Even, Tabin & Flannery LLP

(57) ABSTRACT

A light source unit of the invention includes a first light source configured to emit light in a first wavelength range and a wheel in which a first transmitting area is formed, the first transmitting area being configured to transmit light in the first wavelength range incident from a side facing a first surface of the wheel, and the first transmitting area contains a first luminescent material configured to emit first luminescent light including at least a wavelength range of light in the first wavelength range by light in a second wavelength range whose wavelength range differs from that of light in the first wavelength range being shined from a side facing a second surface of the wheel, the second surface being opposite to the first surface.

24 Claims, 5 Drawing Sheets

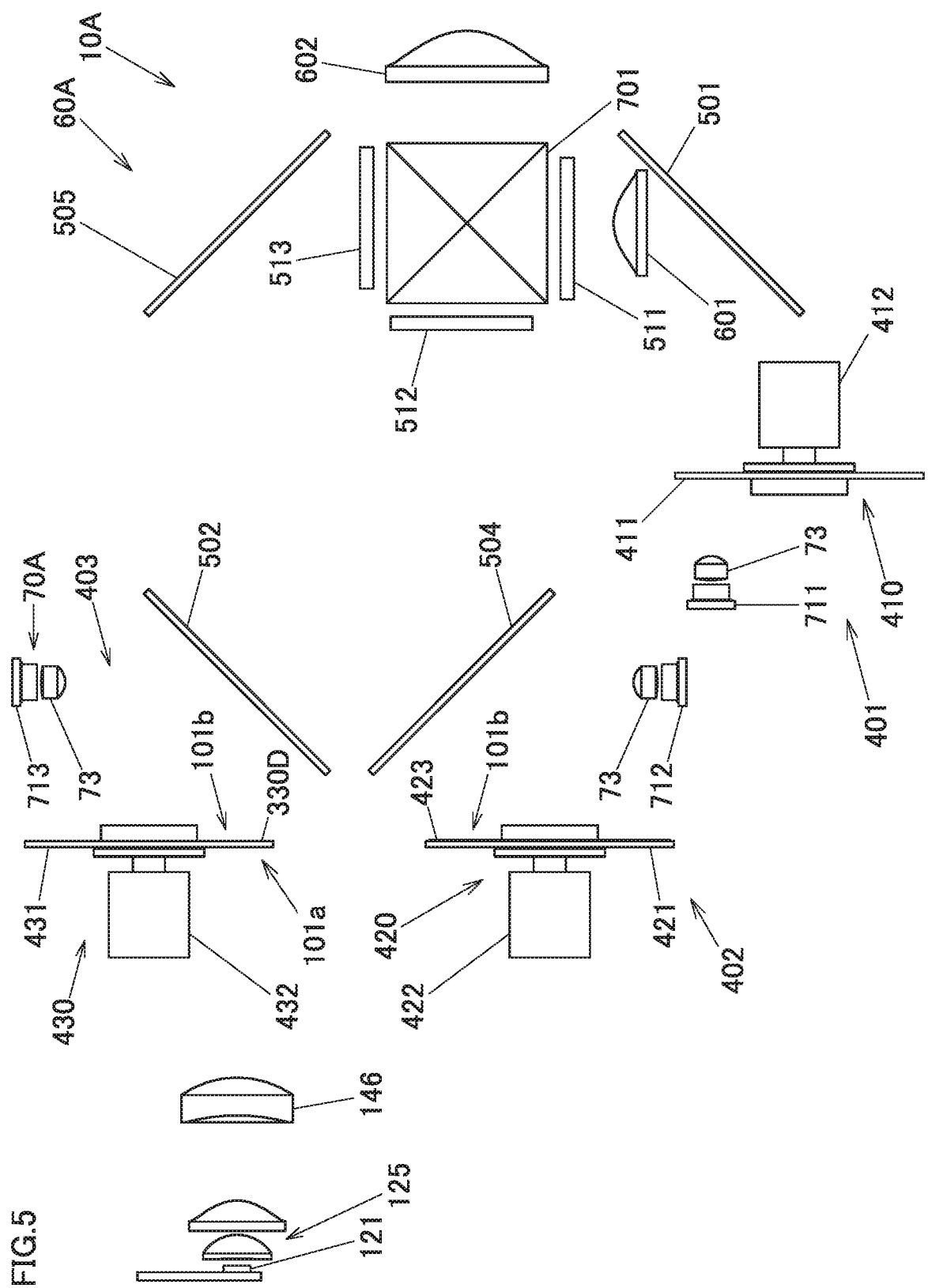

LIGHT SOURCE UNIT AND PROJECTOR

CROSS-REFERENCE TO RELATED APPLICATION

This patent application is based upon and claims the benefit of priority under 35 USC 119 from Japanese Patent Application No. 2018-154872 filed on Aug. 21, 2018, the entire disclosure of which, including the description, claims, drawings, and abstract, is incorporated herein by reference in its entirety.

BACKGROUND OF THE INVENTION

Field of the Invention

The present invention relates to a light source unit and a projector including the light source unit.

Description of the Related Art

In these days, data projectors are widely used on many occasions as a projector for projecting a screen of a personal computer, a video screen, and further, an image based on image data recorded on a memory card or the like onto a screen. In these data projectors, light emitted from a light source is collected onto a micromirror display device called a digital micromirror device (DMD) or a liquid crystal panel so as to display a color image onto a screen.

Japanese Patent Laid-Open No. 2011-13320 (JP-A-2011-13320) discloses a light source unit that includes a luminescent plate, a first light source, and a second light source. A luminescent material layer is formed on the luminescent plate, and this luminescent material layer emits light of a wavelength in a predetermined wavelength range when it receives excitation light. The luminescent material layer emits light of a wavelength in the green wavelength range or, simply, light in the green wavelength range. The first light source is a laser light emitting device for emitting light of a blue wavelength range or, simply, light in the blue wavelength range as excitation light. The first light source shines its excitation light on to the luminescent material layer and a light transmitting portion on the luminescent plate. The second light source is a light emitting diode for emitting light of a wavelength in the red wavelength range or, simply, light in the red wavelength range as light of a wavelength in a different wavelength range from the wavelength range of the luminescent light and the wavelength range of the excitation light.

The light source unit disclosed in JP-A-2011-13320 employs laser light (light in the blue wavelength range) emitted from the first light source and having great directivity, luminescent light (light in the green wavelength range) emitted from the luminescent material layer when the luminescent material layer is excited by laser light, and light in the red wavelength range emitted from the light emitting diode and having lower directivity than that of luminescent light. As this occurs, it is necessary to maintain the required light quantity ratio that is a proportion (a ratio) of light quantity of blue light or light in the blue wavelength range, green light or light in the green wavelength range, and red light or light in the red wavelength range which are required to obtain a predetermined whiteness level (white balance). In this light source unit, however, since the numbers of optical members such as collective lenses, dichroic mirrors, and reflection mirrors through which light in the red wavelength range and light in the green wavelength range pass and the optical lengths thereof are substantially the same, there is often caused a case where light in the red wavelength range has greater difficulty in ensuring its luminance as light source light than light in the green wavelength range due to lose in the optical members. This eventually causes a problem in that when taking into consideration the balance in light quantity among of blue light, green light, and red light, the whole of an image projected by the projector becomes dark, or when attempting to forcibly project a bright image, the quantity of light in the red wavelength range becomes insufficient, deteriorating the balance in light quantity among blue light, green light, and red light.

SUMMARY OF THE INVENTION

The present invention has been made in view of the situations described above, and an object of the present invention is to provide a light source unit that can emit bright light source light and a projector including the light source unit.

According to an aspect of the present invention, there is provided a light source unit including:

a first light source configure to emit light in a first wavelength range; and a wheel in which a first transmitting area is formed, the first transmitting area being configured to transmit light in the first wavelength range incident from a side facing a first surface, wherein the first transmitting area contains a first luminescent material configured to emit first luminescent light including at least a partial wavelength range of light in the first wavelength range by light in a second wavelength range whose wavelength range differs from that of light in the first wavelength range being shined from a side facing a second surface of the wheel, the second surface being opposite to the first surface.

According to another aspect of the present invention, there is provided a projector including:

the light source unit described above;

a display device on to which light source light from the light source unit is shined to form image light;

a projection-side optical system configured to project the image light emitted from the display device on to a screen; and a control unit configured to control the display device and the light source unit.

BRIEF DESCRIPTION OF THE DRAWINGS

FIG. 5 is a schematic plan view illustrating part of an internal structure of a projector according to a second embodiment of the present invention

DETAILED DESCRIPTION OF THE PREFERRED EMBODIMENTS

First Embodiment

Figure 1:
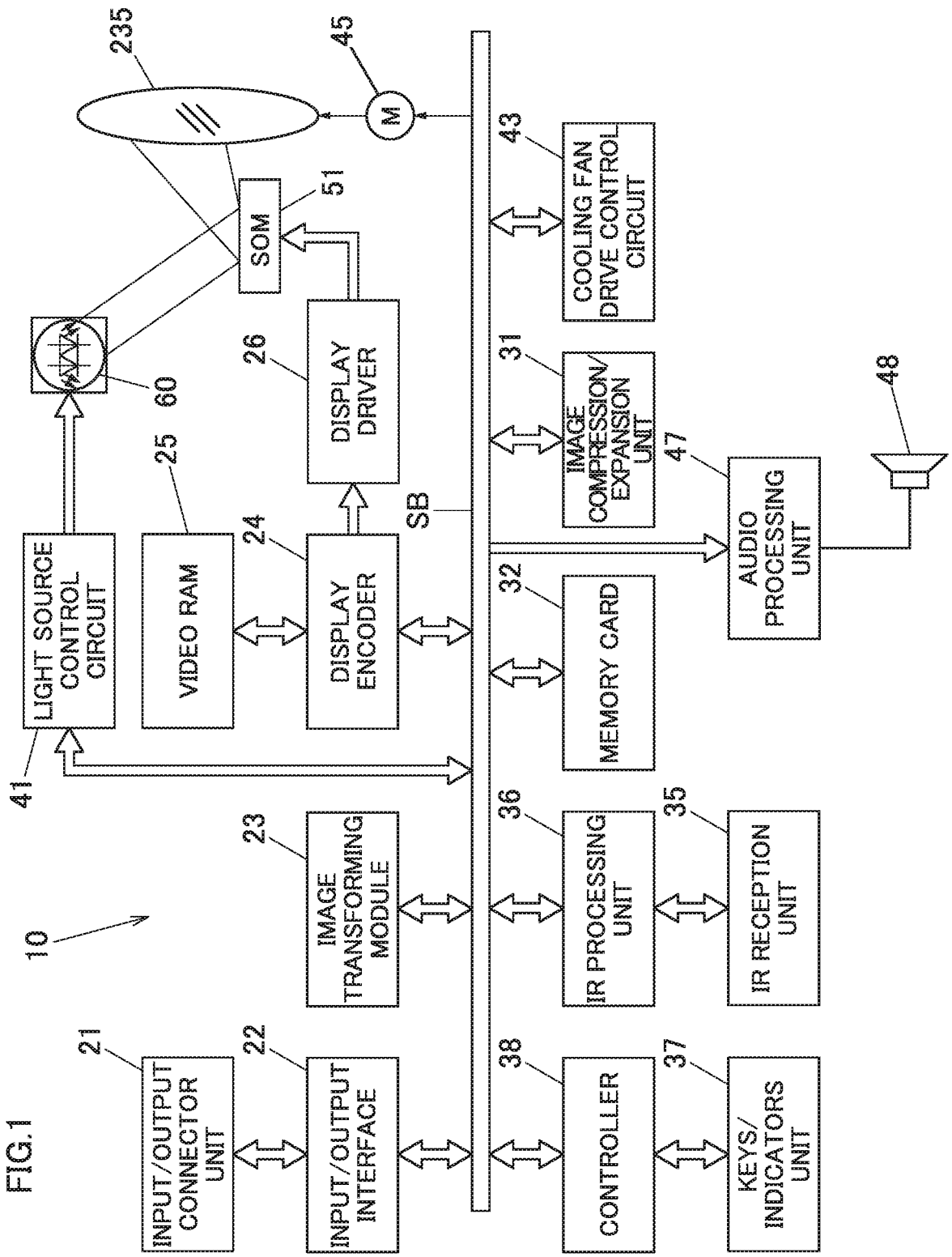
FIG. 1 is a block diagram illustrating functional circuit blocks of a projector according to a first embodiment of the present invention.

Hereinafter, a first embodiment of the present invention will be described. FIG. 1 is a block diagram illustrating functional circuit blocks of a projector 10. A projector control unit includes a controller 38, an input/output interface 22, an image transforming module 23, a display encoder 24, a display driver 26, and the like. Image signals of various standards which are inputted from an input/output connector unit 21 are sent, via the input/output interface 22 and a system bus (SB), to the image transforming module 23, where the image signals are transformed so as to be unified into an image signal of a predetermined format which is suitable for display. Thereafter, the unified image signal to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 functions as a display device controller. The display driver 26 drives a display device 51, which is a spatial optical modulator (SOM), at an appropriate frame rate according to the image signal outputted from the display encoder 24. Then, in the projector 10, pencils of light emitted from a light source unit 60 are shined on to the display device 51 by way of a light guiding optical system to thereby form an optical image by light reflected from the display device 51, and the image so formed is then projected onto a screen, not illustrated, for display by way of a projection-side optical system, which will be described later. A movable lens group 235 of the projection-side optical system is driven by a lens motor 45 for zooming and focusing.

An image compression/expansion unit 31 performs a recording process in which a luminance signal and a color difference signal of an image signal are data compressed through processing of Adaptive Discrete Cosine Transform (ADCT) and Huffman coding, and the compressed data is sequentially written on a memory card 32, which constitutes a detachable recording medium. Further, with the projector 10 set in a reproducing mode, the image compression/expansion unit 31 reads out the image data recorded in the memory card 32 and expands the individual image data that makes up a series of dynamic images frame by frame. Then, the image compression/expansion unit 31 outputs the image data to the display encoder 24 by way of the image transforming module 23 and enables the display of dynamic images based on the image data stored in the memory card 32.

The controller 38 governs the control of operations of individual circuitries inside the projector 10 and includes CPU, ROM storing fixedly operation programs such as various settings, RAM that is used as a work memory, and the like.

Operation signals from a keys/indicators unit 37 including main keys and indicators which are provided on an upper panel of a casing of the projector 10 are sent out directly to the controller 38. Key operation signals from a remote controller are received by an IR reception unit 35 and are then demodulated into a code signal at an Ir processing unit 36 for output to the controller 38.

The controller 38 is connected with an audio processing unit 47 by way of a system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The controller 38 controls a light source control circuit 41, which functions as a light source control unit. The light source control circuit 41 controls individually operations of an excitation light shining device 70, a green light source device 80, and a red light source device 120 (refer to FIG. 2) of the light source unit 60 so that light in predetermined wavelength ranges required in generating an image is emitted from the light source unit 60. Additionally, the light source control circuit 41 can control a synchronizing timing of a luminescent wheel 101 or the like based on a command from the controller 38.

Further, the controller 38 causes a cooling fan drive control circuit 43 to detect temperatures with a plurality of temperature sensors which are provided in the light source unit 60 so as to control revolution speeds of cooling fans based on the results of the temperature detections. Additionally, the controller 38 also causes the cooling fan drive control circuit 43 to keep the cooling fans revolving by use of a timer or the like even after a power supply to a main body of the projector 10 is switched off. Alternatively, the controller 38 causes the cooling fan drive control circuit 43 to cut off the power supply to the main body of the projector 10 depending upon the results of the temperature detections by the temperature sensors.

Figure 2:
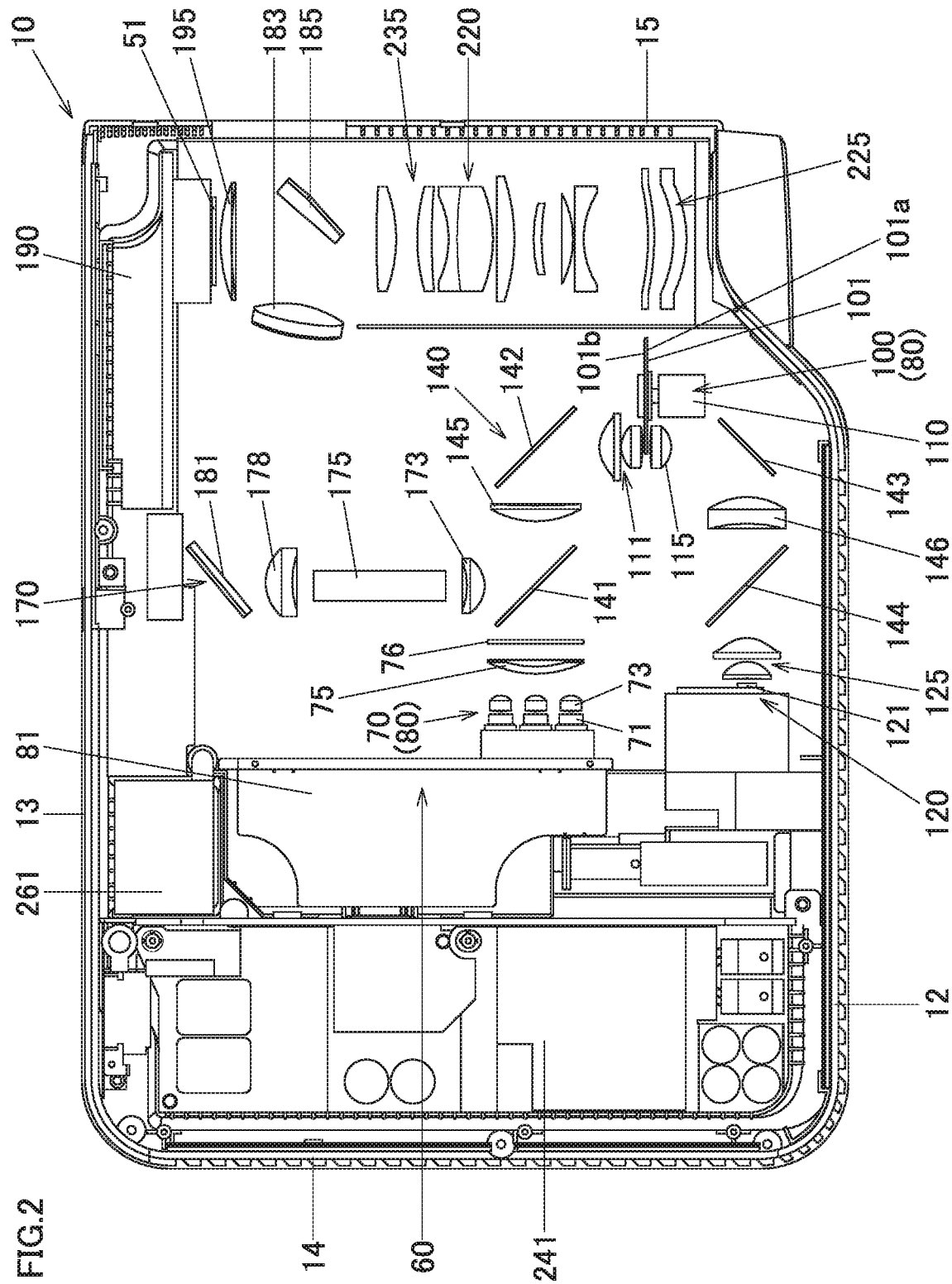
FIG. 2 is a schematic plan view illustrating an internal structure of the projector according to the first embodiment of the present invention.

FIG. 2 is a schematic plan view illustrating an internal structure of the projector 10. It should be noted that in the following description, when left and right are referred to in relation to the projector 10, they denote, respectively, left and right directions with reference to a projecting direction of the projector 10. When front and rear are referred to in relation to the projector 10, they denote, respectively, front and rear directions with reference to a direction from the projector 10 towards a screen and a traveling direction of a pencil of light from the projector 10.

The projector 10 includes a control circuit board 241 in the vicinity of a right panel 14. This control circuit board 241 includes a power supply circuit block, a light source control block, and the like. The projector 10 also includes the light source unit 60 to a side of the control circuit board 241, that is, at a substantially central portion of the casing of the projector 10. Further, the projector 10 includes a light source-side optical system 170 and a projection-side optical system 220 that are disposed between the light source unit 60 and a left panel 15.

The light source unit 60 includes the excitation light shining device 70, which constitutes not only a light source of light of a wavelength in the blue wavelength range or, simply, light in the blue wavelength range (light in a second wavelength range) but also an excitation light source, the red light source device 120, which constitutes a light source of light of a wavelength in the red wavelength range or, simply, light in the red wavelength range (light in a first wavelength range), and the green light source device 80, which constitutes a light source of light of a wavelength in the green wavelength range or, simply, light in the green wavelength range (light in a third wavelength range, second luminescent light). The green light source device 80 is made up of the excitation light shining device 70 and a luminescent wheel device 100. Then, a light guiding optical system 140 is disposed in the light source unit 60, and this light guiding optical system 140 guides and outputs light in the blue wavelength range, light in the green wavelength range, and light in the red wavelength range. The light guiding optical system 140 guides light rays in the blue, green and red wavelength ranges that are emitted from the light source devices (the excitation light shining device 70, the green light source device 80, and the red light source device 120), respectively, to a combined optical path of the light source-side optical system 170.

The excitation light shining device 70 is disposed at a substantially central portion of the casing of the projector 10 in a left-right direction. The excitation light shining device 70 includes a light source group made up of blue laser diodes 71 (a second light source) that are a plurality of semiconductor light emitting elements disposed in such a manner that optical axes thereof are parallel to a rear panel 13, a collective lens 75 configured to collect light rays in the blue wavelength range individually emitted from the blue laser diodes 71, a defusing plate 76, a heat sink 81 disposed between the blue laser diodes 71 and the right panel 14, and the like.

The light source group is formed by arranging the plurality of laser diodes 71 into a matrix configuration. In this embodiment, assuming that an up-down direction in FIG. 2 is referred to as a column and a direction perpendicular to a surface of a sheet of paper on which FIG. 2 is drawn is referred to as a row, a total of six blue laser diodes is arranged into a matrix configuration of two rows and three columns in a side view as viewed from the left side panel 15.

A plurality of collimator lenses 73 are disposed individually on optical axes of the blue laser diodes 71 so as to convert light emitted from the corresponding blue laser diodes 71 into parallel light to thereby enhance the directivity of the emitted light. Additionally, the collective lens 75 contracts pencils of light emitted from the blue laser diodes 71 in one direction and emit them towards a first dichroic mirror 141. The diffusing plate 76 is disposed on a side of the collective lens 75 which faces the left panel 15. The diffusing plate 76 diffusion transmits the pencils of light in the blue wavelength range collected at the collective lens 75.

A cooling fan 261 is disposed between the heat sink 81 and the rear panel 13, whereby the blue laser diodes 71 are cooled by this cooling fan 26 and the heat sink 81.

The red light source device 120 includes a red light emitting diode 121 (a first light source) disposed in such a manner that an optical axis thereof becomes parallel to those of the blue laser diodes 71 and a collective lens group 125 configured to collect light emitted from the red light emitting diode 121. The red light emitting diode 121 is a semiconductor light emitting element that emits light in the red wavelength range. Since the red light source device 120 is disposed on the same side as the excitation light shining device 70, that is, on aside facing the right panel 14, a cooling air flow path and the cooling fan can be shared commonly between the excitation light shining device 70 and the red light source device 120, whereby the cooling configuration can be simplified.

The luminescent wheel device 100 making up the green light source device 80 is disposed on a side facing of the projection-side optical system 220 with reference to the excitation light shining device 70 and the red light source device 120. The luminescent wheel device includes a luminescent wheel 101, a motor 110, a collective lens group 111, and a collective lens 115. The luminescent wheel 101 is disposed in such a manner as to become parallel to a front panel 12, that is, in such a manner as to be at right angles to an axis of light emitted from the excitation light shining device 70 that is guided via a first reflection mirror 142. The motor 110 drives to rotate the luminescent wheel 101. The collective lens group 111 not only collects a pencil of excitation light emitted from the excitation light shining device 70 to the luminescent wheel 101 but also collects a pencil of light that the luminescent wheel 101 emits in a direction towards the rear panel 13. The collective lens 115 collects a pencil of light that the luminescent wheel 101 emits in a direction towards the front panel 12. A cooling fan, not shown, is disposed on a side of the motor 110 that faces the front panel 12, so that the luminescent wheel device 100 is cooled by this cooling fan.

Figure 3:
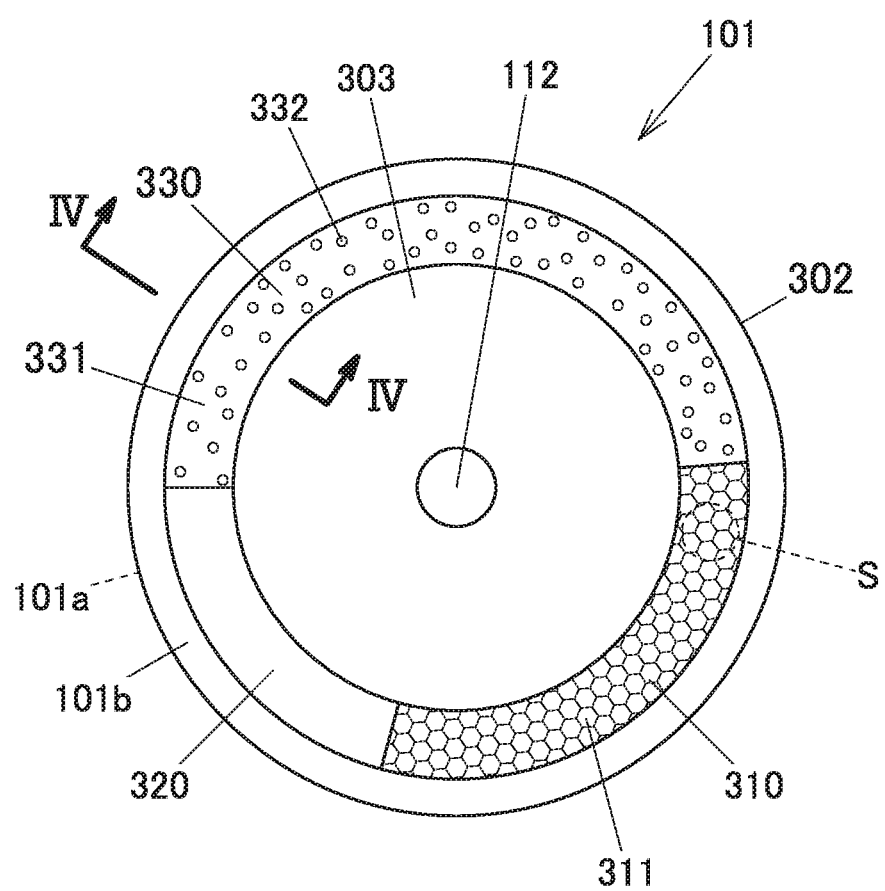
FIG. 3 is a schematic front view of a luminescent wheel according to the first embodiment of the present invention.
Figure 4A:
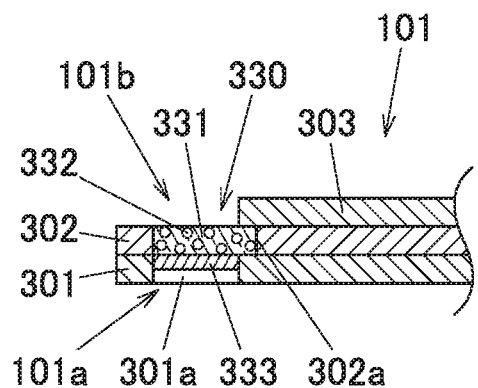
FIG. 4A is an enlarged cross-sectional view illustrating the luminescent wheel according to the first embodiment of the present invention.

Here, the luminescent wheel 101 will be described using FIG. 3. The luminescent wheel 101 has a first surface 101*a* on to which light in the red wavelength range is shined and a second surface 101*b* on to which light in the blue wavelength range is shined. FIG. 3 illustrates a side of the luminescent wheel 101 which constitutes the second surface 101*b*. Additionally, FIG. 4A is a cross-sectional view of the luminescent wheel 101 taken along a line IV-IV shown illustrated in FIG. 3.

The luminescent wheel 101 is formed into a substantially circular disc and is fixed to a shaft portion 112 of the motor 110 at a central portion thereof. The luminescent wheel 101 includes a reflection plate 302 made up of a metallic base of copper or aluminum, and a surface of a side of the reflection plate 302 which faces the second surface 101*b* and on which light in the blue wavelength range is incident is mirror finished through silver deposition or the like. A luminescent light emitting area 310, a second transmitting area 320, and a first transmitting area 330 are provided end to end in a circumferential direction at a portion of the luminescent wheel 101 lying in the vicinity of an outer circumferential edge thereof. The luminescent wheel 101 rotates while light in the blue wavelength range or light in the red wavelength range is being shined on to a shining area S, whereby an area corresponding to the shining area S changes to the luminescent light emitting area 310, the second transmitting area 320 or the first transmitting area 330 with time. Consequently, the luminescent wheel 101 can emit light in different colors according to the area (the luminescent light emitting area 310, the second transmitting area 320, and the first transmitting area 330) that comes to be positioned in the shining area S and light shined on thereto.

The luminescent light emitting area 310 is formed on the mirror finished surface of the reflection plate 302. A green luminescent material 311 (a second luminescent material) is formed on the luminescent light emitting area 310 in such a manner as to be laid out in the circumferential direction. When light in the blue wavelength range emitted from the excitation light shining device 70 is shined on to the green luminescent material 311, the green luminescent material 311 emits light in the green wavelength range (light in a third wavelength range) whose wavelength component lies adjacent to or overlaps that of light in the red wavelength range towards the second surface 101*b* as luminescent light.

The second transmitting area is formed by fitting a light transmitting member having light transmitting properties such as glass or the like in a cut-out opening portion formed in an outer circumferential edge portion of the reflection plate 302, which constitutes the base material of the luminescent wheel 101. When light in the blue wavelength range is shined on to the second transmitting area 320 from a side thereof that faces the second surface 101b, the second transmitting area 320 transmits the light in the blue wavelength range to an opposite side to the side facing the second surface 101b, that is, a side thereof that faces the first surface 101a. In the case where a diffuse layer is formed on the second transmitting area 320, the second transmitting area 320 can transmit the light in the blue wavelength range while diffusing it.

As shown in FIG. 4A, the luminescent wheel 101 is formed by holding the reflection plate 302 between a first support plate 301 and a second support plate 303. The first support plate 301, the reflection plate 302, and the second support plate 303 each have a circular disc shape and are fixed to the shaft portion 112 illustrated in FIG. 3. An opening portion 302a, which has an arc-like shape in a plan view, is formed in the reflection plate 302 so that a light transmitting member 331 is fitted therein. An opening portion 301a, which has an arc-like shape in a plan view, is formed in the first support plate 301a in a position that corresponds to the opening portion 302a. The light transmitting member 331, which is now disposed inside the opening portion 302a, is held by a portion of an inner edge of the opening portion 301a and an outer edge of the second support plate 303.

The first transmitting area 330 can be formed by the light transmitting member 331 such as glass in an interior of which a red luminescent material 332 (a first luminescent material) is disposed to be dispersed. Consequently, a density in which the red luminescent material 332 is disposed in the first transmitting area 330 becomes coarser (lower) than a density in which the green luminescent material 311 is disposed in the luminescent light emitting area 310. When light in the red wavelength range is shined on to a side of the first transmitting area 330 that faces the first surface 101a, the first transmitting area 330 transmits the light in the red wavelength range to a side thereof that faces the second surface 101b. In addition, when light in the blue wavelength range emitted from the excitation light shining device 70 is shined on to the red luminescent material 332 in the interior thereof, the first transmitting area 330 can cause light in the red wavelength range, which is luminescent light (first luminescent light), to be emitted in every direction including the side facing the first surface 101a and the side facing the second surface 101b. Light in the red wavelength range emitted from the red luminescent material 332 towards the side facing the second surface 101b is collected at the collective lens group 111 to be emitted towards a first reflection mirror 142 together with light in the red wavelength range from the red light emitting diode 121. A reflection film 333 configured to reflect light in the blue wavelength range can be formed on the light transmitting member 331 on the side of the luminescent wheel 101 that constitutes the first surface 101a. As a result, light emitted from the blue laser diodes 71 to be incident on the luminescent wheel 101 from the side constituting the second surface 101b can be reflected from towards the side facing the second surface 101b. This can increase the opportunity where light in the blue wavelength range that is reflected without exciting the red luminescent material 332 is shined again on to the red luminescent material 332, so that the red luminescent material 332 can be excited with good efficiency, whereby compared with a case where no reflection film 333 is provided, more luminescent light can be obtained.

The first transmitting area 330 is described as being formed by the light transmitting member 331 in the interior of which the red luminescent material 332 is disposed to be dispersed, but the present invention is not limited to this configuration. As will be described in a first modified example illustrated in FIG. 4B, a first transmitting area 330 positioned in a third period where it emits light in the red wavelength range can be formed by a light transmitting member 331A in which a red luminescent material 332A is disposed on a surface of a side thereof that faces a second surface 101b.

Returning to FIG. 2, the light guiding optical system 140 includes a first dichroic mirror 141, the first reflection mirror 142, a second reflection mirror 143, and a second dichroic mirror 144. Additionally, the light guiding optical system 140 includes collective lenses 145, 146.

The first dichroic mirror 141 is disposed between the diffusing plate 76 and the collective lens 145 and between the second dichroic mirror 144 and a collective lens 173. The first dichroic mirror 141 transmits light in the blue wavelength range and reflects light in the red wavelength range and light in the green wavelength range. The first dichroic mirror 141 transmits light in the blue wavelength range emitted from the diffusing plate 76 to guide it to the collective lens 145 and also transmits light in the blue wavelength range reflected by the second dichroic mirror 144 to guide it to the collective lens 173. Additionally, the first dichroic mirror 141 reflects light in the red wavelength and light in the green wavelength range that are shined from the collective lens 145 to guide them to the collective lens 173.

The first reflection mirror 142 is disposed on a side of the first dichroic mirror 141 that faces the left panel 15 and on the side of the luminescent wheel 101 that faces the rear panel 13 and reflects light in the blue, green, and red wavelength ranges. The collective lens 145 is disposed between the dichroic mirror 141 and the first reflection mirror 142. The first reflection mirror 142 reflects light in the blue wavelength range that is incident thereon from the first dichroic mirror 141 by way of the collective lens 145 and reflects light in the red wavelength range and light in the green wavelength rage that are emitted from the luminescent wheel 101 by way of the collective lens group 111 towards the first dichroic mirror 141.

The second reflection mirror 143 is disposed on the side of the luminescent wheel 101 that constitutes the first surface 101a and on an axis of light in the red wavelength range emitted from the red light source 120. The second reflection mirror 143 reflects light in the blue wavelength range and light in the red wavelength range. The second reflection mirror 143 reflects light in the blue wavelength range emitted from the luminescent wheel 101 by way of the collective lens 115 towards the second dichroic mirror 144 and reflects light in the red wavelength range shined from the second dichroic mirror towards the luminescent wheel 101.

The second dichroic mirror 144 is disposed between the red light source device 120 and the second reflection mirror 143 and transmits light in the red wavelength range, while reflecting light in the blue wavelength range. The collective lens 146 is disposed between the second reflection mirror 143 and the second dichroic mirror 144. The second dichroic mirror 144 reflects light in the blue wavelength range that is incident thereof from the second reflection mirror 143 by way of the collective lens 146 towards the first dichroic mirror 141 and transmits light in the red wavelength range emitted from the red light source device 120 towards the second reflection mirror 143.

As a result of the light guiding optical system 140 being configured in the way described heretofore, light in the blue wavelength range that has passed through the first dichroic mirror 141, and light in the red wavelength range and light in the green wavelength range that are reflected by the first dichroic mirror 141 are collected to the collective lens 173 of the light source-side optical system 170. Then, the light in the blue, red, and green wavelength ranges is guided to the combined optical path provided in the light source-side optical system 170.

The light source-side optical system 170 is made up of the collective lens 173, a light guiding device 175 such as a light tunnel or a glass rod, a collective lens 178, a light axis turning mirror 181, a collective lens 183, a light shining mirror 185, and a condenser lens 195. Since the condenser lens 195 emits image light emitted from the display device 51 disposed on a side of the condenser lens 195 that faces the rear panel 13 towards the projection-side optical system 220, the condenser lens 195 also constitutes part of the projection-side optical system 220.

The collective lens 173 is disposed in the vicinity of an incident port of the light guiding device 175 to collect light source light. Light in the blue, red, and green wavelength ranges that is collected by the collective lens 173 is emitted towards the light guiding device 175.

The light axis turning mirror 181 is disposed on an optical axis of the light guiding device 175 and directly behind the collective lens 178. A pencil of light emitted from an emerging port of the light guiding device 175 is collected at the collective lens 178 and is thereafter reflected towards the collective lens 183 by the light axis turning mirror 181.

The pencil of light reflected at the light axis turning mirror 181 is collected by the collective lens 183 and is thereafter shined on to the display device 51 at a predetermined angle by way of the condenser lens 195 by the light shining mirror 185. The display device 51, which is made up of DMD, includes a heat sink 190 provided at a side thereof that faces the rear panel 13, whereby the display device 51 is cooled by this heat sink 190.

The pencil of light, which is light source light shined on an image forming surface of the display device 51 by the light source-side optical system 170, is reflected on the image forming surface of the display device 51 to be projected on to a screen by way of the projection-side optical system 220 as projected light. Here, the projection-side optical system 220 is made up of the condenser lens 195, the movable lens group 235, a fixed lens group 225, and the like. The movable lens group 235 is made to move by the lens motor. Then, the movable lens group 235 and the fixed lens group 225 are incorporated in a fixed lens barrel. Thus, the fixed lens barrel including the movable lens group 235 is configured as a variable-focus lens that can be controlled for zooming and focusing.

Next, a driving example of the light source unit 60 will be described. The light source control circuit 41 drives the light source unit 60 in such a manner that a first time period when light in the green wavelength range is emitted, a second time period when light in the blue wavelength range is emitted, and a third time period when light in the red wavelength range is emitted are included in time-shared segmented time periods of one frame.

In the first time period, since the shining area S of light in the blue wavelength range emitted from the excitation light shining device 70 is positioned on the luminescent light emitting area 310, light in the green wavelength range is emitted from the luminescent wheel 101 and is then guided to the light source-side optical system 170 by the light guiding optical system 140.

In the second time period, since the shining area S of light in the blue wavelength range emitted from the excitation light shining device 70 is positioned on the second transmitting area 320, light in the blue wavelength range is emitted from the luminescent wheel 101 and is then guided to the light source-side optical system 170 by the light guiding optical system 140.

In the third time period, since the shining area S of light in the red wavelength range emitted from the red light source device 120 is positioned on the first transmitting area 330, light in the red wavelength range is emitted from the luminescent wheel 101 and is then guided to the light source-side optical system 170 by the light guiding optical system 140. Additionally, in the third time period, light in the blue wavelength range can be emitted from the excitation light shining device 70 to be shined on to the first transmitting area 330. Light in the blue wavelength range that is shined on to the first transmitting area 330 excites the red luminescent material 332 so as to cause light in the red wavelength range to be emitted from the red luminescent material 332. Due to this, in the third time period, light emitted from the red light source device 120 and light emitted from the red luminescent material 332 are both combined together, so that bright light in the red wavelength range can be guided to the light source-side optical system 170.

As a result of the projector 10 being configured in the way described above, when the luminescent wheel 101 is rotated, and light is emitted from the excitation light shining device 70 and the red light source device 120 at appropriate timings, light in the green wavelength, light in the blue wavelength range, and light in the red wavelength range are incident on the display device 51 by way of the light guiding system 140 and the light source-side optical system 170. As a result, DMD, which is the display device 51 of the projector 10, displays green light, blue light, and red light in a time-sharing fashion according to the data, thereby making it possible to project a color image onto the screen.

In addition, in the light source unit 60, light in the red wavelength range and light in the green wavelength range whose wavelength components lie adjacent to or overlap each other are configured in such a manner that their optical path are neither divided nor combined by the wavelength components, whereby the utilization efficiency of light in the red wavelength range and light in the green wavelength range can be improved. Incidentally, a wavelength component of red light and a wavelength component of green light sometimes overlap each other partially, and when their optical paths are combined trough transmission or reflection of an optical path combining member, the overlapping wavelength component of either the red light or the green light cannot be guided, whereby light source light becomes dark. However, according to the configuration of the light source unit 60 described above, this problem can be solved.

Next, first to third modified examples of the first transmitting area 330 provided on the luminescent wheel 101 of the first embodiment will be described by use of FIGS. 4B to 4D.

First Modified Example

Figure 4B:
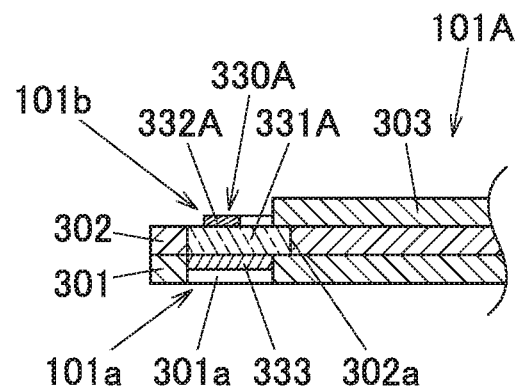
FIG. 4B is an enlarged cross-sectional view of a luminescent wheel according to a first modified example in which a red luminescent material is formed on a surface of a transmitting area.

FIG. 4B is a cross-sectional view of a first transmitting area 330A of a luminescent wheel 101A according to a first modified example. The luminescent wheel 101A includes the first transmitting area 330A in place of the first transmitting area 330 of the luminescent wheel 101 illustrated in FIG. 3. The first transmitting area 330A has an arc-like shape in a plan view, as with the first transmitting area 330. A cross-sectioned position in FIG. 4B is the same as the cross-sectioned position in FIG. 4A.

The first transmitting area 330A includes a light transmitting member 331A in place of the light transmitting member 331. the reflection film 333 is formed on a side of the light transmitting member 331A that faces the first surface 101a. In addition, a red luminescent material 332A is formed at a portion of a surface of a side of the light transmitting member 331A that faces the second surface 101b. In a plan view of the luminescent wheel 101A, the red luminescent material 332A is formed smaller in area than the first transmitting area 330A. The red luminescent material 332A can be formed substantially into an arc-like shape in such a manner as to extend over a longitudinal direction of the first transmitting area 330A along a circumferential direction of the luminescent wheel 101A. The red luminescent material 332A is formed narrower in width than the light transmitting member 331A.

In the first modified example, when light in the red wavelength range emitted from the red light emitting diode 121 is shined on the side of the light transmitting member 331A that faces the first surface 101a, the light in the red wavelength range passes sequentially through the reflection film 333 and the light transmitting member 331A in that order and is then emitted from the side of the light transmitting member 331A that faces the second surface 101b. In addition, when light in the blue wavelength range emitted from the blue laser diodes 1 as excitation light is shined on the side of the light transmitting member 331A that faces the second surface 101b, the light in the blue wavelength range excites the red luminescent material 332A. The red luminescent material 332A is excited by the light in the blue wavelength range to thereby emit light in the red wavelength range in every direction. Light in the red wavelength range emitted to the side of the light transmitting member 331A that faces the second surface 101b is collected at the collective lens group 111 illustrated in FIG. 2 as emitted light of the luminescent wheel 101A. In this modified example, since the red luminescent material 332A is formed on the surface of the light transmitting member 331A, a high light emitting efficiency can be obtained, compared with the case where the red luminescent material is disposed to be dispersed in the light transmitting member.

Second Modified Example

Figure 4C:
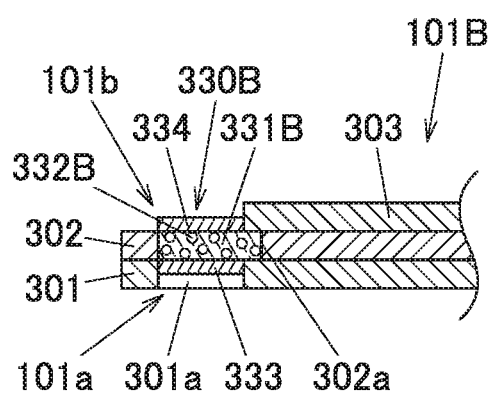
FIG. 4C is an enlarged cross-sectional view of a luminescent wheel according to a second modified example in which a yellow luminescent material is dispersed in an interior of a light transmitting area.

FIG. 4C is a cross-sectional view of a first transmitting area 330B of a luminescent wheel 101B according to a second modified example. The luminescent wheel 101B includes the first transmitting area 330B in place of the first transmitting area 330 of the luminescent wheel 101. The first transmitting area 330B has an arc-like shape in a plan view, as with the first transmitting area 330. A cross-sectioned position in FIG. 4C is the same as the cross-sectioned position in FIG. 4A.

The first transmitting area 330B includes a light transmitting member 331B in place of the light transmitting member 331. The reflection film 333 is formed on a side of the light transmitting member 331A that faces the first surface 101a. Additionally, a yellow luminescent material 332B (a first luminescent material) is disposed so as to be dispersed in an interior of the light transmitting member 331B. A dichroic filer 334 is coated on a side of the light transmitting member 331B that faces the second surface 101b, the dichroic filter 334 being configured to transmit light in the blue wavelength range and light in the red wavelength range while cutting off light in the green wavelength range.

In the second modified example, when light in the red wavelength range emitted from the red light emitting diode 121 is shined on the side of the light transmitting member 331B that faces the first surface 101a, the light in the red wavelength range passes sequentially through the reflection film 333, the light transmitting member 331B and the dichroic filter 334 in that order and is then emitted from the side of the light transmitting member 331B that faces the second surface 101b. In addition, when light in the blue wavelength emitted from the blue laser diodes 71 as excitation light is shined on the side of the light transmitting member 331B that faces the second surface 101b, the light in the blue wavelength range passes through the dichroic filter 334 to enter an interior of the light emitting member 331B. Then, the yellow luminescent material 332B is excited by the light in the blue wavelength range that enters the light transmitting member 331B, whereby light of a wavelength in the yellow wavelength range or, simply, light in the yellow wavelength range (light in a fourth wavelength range, first luminescent light) is emitted in every direction. A green wavelength component of light in the yellow wavelength range emitted to the side of the light transmitting member 331B that faces the second surface 101b is removed by the dichroic filter 334, whereby the light in the yellow wavelength range is emitted from the luminescent wheel 101B as light in the red wavelength range and is then collected at the collective lens group 111 illustrated in FIG. 2.

Third Modified Example

Figure 4D:
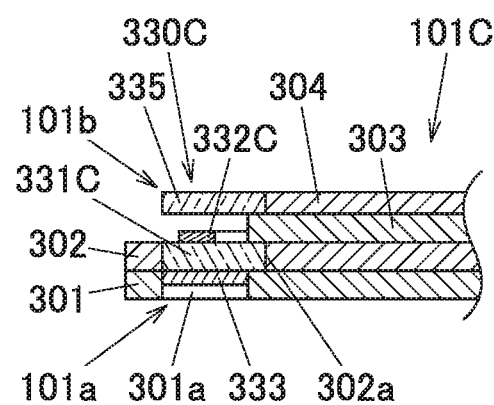
FIG. 4D is an enlarged cross-sectional view of a luminescent wheel according to a third modified example in which a yellow luminescent material is formed on a surface of a transmitting area.

FIG. 4D is a cross-sectional view of a first transmitting area 330C of a luminescent wheel 101C according to a third modified example. The luminescent wheel 101C includes the third transmitting area 330C in place of the first transmitting area 330 of the luminescent wheel 101 illustrated in FIG. 3. The third transmitting area 330C has an arc-like shape in a plan view, as with the first transmitting area 330. A cross-sectioned position in FIG. 4D is the same as the cross-sectioned position in FIG. 4A.

The first transmitting area 330C includes a light transmitting member 331C in place of the light transmitting member 331. The reflection film 333 is formed on a side of the light transmitting member 331C that faces the first surface 101a. In addition, a yellow luminescent material 332C is formed at a portion of a surface of a side of the light transmitting member 331C that faces the second surface 101b. In a plan view of the luminescent wheel 101C, the yellow luminescent material 332C is formed smaller in area than the first transmitting area 330C. The yellow luminescent material 332C can be formed substantially into an arc-like shape in such a manner as to extend over a longitudinal direction of the first transmitting area 330C along a circumferential direction of the luminescent wheel 101C. In this case, the yellow luminescent material 332C can be formed narrower in width than the light transmitting member 331C.

A dichroic filer 335 is disposed on a side of the light transmitting member 331C that faces the second surface 101b, the dichroic filter 335 being configured to transmit light in the red wavelength range and light in the blue wavelength range while cutting off light in the green wavelength range. The dichroic filter 335 is supported by a support plate 304 that is provided on a side of a second side member 303 that faces the second surface 101b and is fixedly disposed in such a manner as to be spaced apart from the light transmitting member 331C.

In the third modified example, when light in the red wavelength range emitted from the red light emitting diode 121 is shined on the side of the light transmitting member 331C that faces the first surface 101a, the light in the red wavelength range passes sequentially through the reflection film 333, the light transmitting member 331C and the dichroic filter 335 in that order and is then emitted from the side of the light transmitting member 331C that faces the second surface 101b. In addition, when light in the blue wavelength emitted from the blue laser diodes 71 as excitation light is shined on the side of the light transmitting member 331C that faces the second surface 101b, the light in the blue wavelength range passes through the dichroic filter 335 to excite the yellow luminescent material 332C. The yellow luminescent material 332C is excited by the light in the blue wavelength range, whereby light of a wavelength in the yellow wavelength range or, simply, light in the yellow wavelength range (light in a fourth wavelength range) is emitted in every direction. A green wavelength component of light in the yellow wavelength range emitted to the side of the light transmitting member 331C that faces the second surface 101b is removed by the dichroic filter 335, whereby the light in the yellow wavelength range is emitted from the luminescent wheel 101C as light in the red wavelength range and is then collected at the collective lens group 111 illustrated in FIG. 2. In this modified example, since the yellow luminescent material 332C is formed on the surface of the light transmitting member 331C, a high light emitting efficiency can be obtained, compared with the case where the yellow luminescent material is disposed to be dispersed in the light transmitting member.

The red luminescent material 332A of the first modified example and the yellow luminescent material 332C of the third modified example may be formed intermittently along the circumferential direction on the side of the light transmitting member 331A, 331C that faces the second surface 101b.

Second Embodiment

Next, a second embodiment will be described. FIG. 5 is a schematic plan view illustrating an internal structure of a projector 10A according to a second embodiment. In this embodiment, the projector 10A will be described which includes display devices 511 to 513, a light source unit 60A, and a liquid crystal driver in place of the display device 51, the light source unit 60, which are both illustrated in FIG. 2, and the display driver 26, respectively. A light source control circuit 41 controls a light emitting operation of the light source unit 60A. The liquid crystal driver controls the switching between a transmission of light and a cut-off of light at the display devices 511, 512, 513. In this embodiment, like reference signs will be given to like configurations to those of the projector 10, so that the description thereof will be omitted or simplified.

In FIG. 5, the light source unit 60A includes a blue laser diode 71 and a diffusing wheel device 410 as a blue light source device 401. A diffuse transmission area is formed to extend circumferentially into a ring-like shape along a full circumference of a diffusing wheel 411 of the diffusing wheel device 410 in the vicinity of an outer circumferential edge of the diffusing wheel 411.

A green light source device 402 includes a laser diode 712 configured to emit excitation light and a luminescent wheel device 420. A luminescent light emitting area 423 is formed to extend circumferentially into a ring-like shape along a full circumference of a luminescent wheel 421 of the luminescent wheel device in the vicinity of an outer circumferential edge of the luminescent wheel 421. The luminescent light emitting area 423 is excited by light emitted from the laser diode 712 to thereby emit light of a wavelength in the green wavelength range or, simply, light in the green wavelength range.

A red light source device 403 includes a laser diode 713 configured to emit excitation light, a red light emitting diode (a first light source) 121, and a transmission wheel device 430. A transmitting area 330D (an area having a similar cross-sectional configuration to that of the first transmitting area 330 illustrated in FIG. 4A) is formed circumferentially into a ring-like shape along a full circumference of a transmitting wheel 431 of the transmitting wheel device 430 in the vicinity of an outer circumferential edge of the transmitting wheel 431. The transmitting area 330D can be formed of a light transmitting material such as glass in which a red luminescent material 332A is provided on a surface thereof or the red luminescent material 332A is disposed to be dispersed in an interior thereof as with the configurations illustrated in FIGS. 4A and 4B.

When light of a wavelength in the red wavelength range or, simply, light in the red wavelength range is shined on to the transmitting area 330D from a side thereof that faces a first surface 101a of the transmitting wheel 431, the transmitting area 330D transmits the light in the red wavelength range to a side thereof that faces a second surface 101b of the transmitting wheel 431. Additionally, when light of a wavelength in the blue wavelength range or, simply, light in the blue wavelength range or ultraviolet ray emitted from the laser diode 713 of an excitation light shining device 70A is shined on to the red luminescent material in the interior of the transmitting area 330D, the transmitting area 330D can emit light in the red wavelength range in every direction including the side facing the first surface 101a and the side facing the second surface 101b. Similar to the luminescent wheel 101 in the first embodiment, a reflection film 333 configured to reflect light in the blue wavelength range is formed on the first surface 101a of the transmitting wheel 431 (refer to FIG. 4A), whereby excitation light incident from the side facing the second surface 101b can be reflected. Being different from the first embodiment, in the second embodiment, since the light source unit 60A includes the blue light source device 401 separately from the excitation light source, in the case where light emitted from the excitation light shining device 70A is ultraviolet ray, a reflection film 333 configured to reflect ultraviolet ray can be formed on the first surface 101a of the transmitting wheel 431. Thus, light in the red wavelength range can be emitted with good efficiency, and hence, compared with a case where no reflection film is provided, more luminescent light can be obtained.

Similar to the second modified example illustrated in FIG. 4C, a yellow luminescent material 332B may be disposed to be dispersed in an interior of the light transmitting material of the transmitting area 330D in place of the red luminescent material 332. In this case, however, a red light transmitting filter configured to transmit only light in the red wavelength range is desirably provided between the transmitting wheel 431 and the display device 513.

The diffusing wheel 411, the luminescent wheel 421, and the transmitting wheel 431 that are provided in the diffusing wheel device 410, the luminescent wheel device 420, and the transmitting wheel device 430, respectively, are driven to rotate by motors 412, 422, 432 (drive devices), respectively.

Next, the blue light source device 401 will be described. Light in the blue wavelength range emitted from the blue laser diode 711 of the blue light source device 401 is collected by a collimator lens 73 to be transformed into parallel light and is then emitted towards the diffusing wheel 411. The diffusing wheel 411 is formed in such a way that a diffuse transmission area, which is a single light source segment, is provided to extend along a full circumference of the diffusing wheel 411. The light in the blue wavelength range emerging from the collimator lens 73 passes through the diffusing wheel 411 while being diffused and travels to a reflection mirror 501. The light in the blue wavelength range emerging from the diffusing wheel 411 is then reflected by the reflection mirror 501, is collected by a collective lens 601, and is thereafter incident on the display device 511.

Next, the green light source device 402 will be described. Light in the blue wavelength range or ultraviolet ray emitted from the laser diode 712 as excitation light is collected by a collimator lens 73 to be transformed into parallel light and is then incident on a dichroic mirror 504. The dichroic mirror 504 reflects light in the blue wavelength range or ultraviolet ray and transmits light in the green wavelength range. The light in the blue wavelength range or ultraviolet ray that is reflected by the dichroic mirror 504 is guided towards the luminescent wheel 421.

The luminescent wheel 421 emits light in the green wavelength range as luminescent light when light in the blue wavelength range or ultraviolet ray is shined on to the luminescent light emitting area 423. Since the reflection film configured to reflect excitation light and luminescent light is formed on the second surface 101b of the luminescent wheel 421, luminescent light that diffuses in every direction can be reflected towards the second surface 101b. Additionally, since excitation light that does not contribute to excitation of the luminescent material is reflected by the reflection film, the excitation light is enabled to contribute to excitation of the luminescent material again in the luminescent light emitting area 423. Luminescent light is emitted to the dichroic mirror 504. The light in the green wavelength range that passes through the dichroic mirror 504 is incident on the display device 512.

Next, the red light source device 403 will be described. Light in the blue wavelength range or ultraviolet ray emitted from the laser diode 713 as excitation light is collected by a collimator lens 73 to be transformed into parallel light and is then incident on a dichroic mirror 502. The dichroic mirror 502 reflects the light in the blue wavelength range or ultraviolet ray, and the light in the blue wavelength range or ultraviolet ray that is reflected by the dichroic mirror 502 is guided towards the transmitting wheel 431.

The transmitting area 330D is formed on the transmitting wheel 431 in such a manner as to extend circumferentially along the full circumference of the transmitting wheel 431. As with the configuration illustrated in FIG. 4A, the transmitting area 330D is formed of the light transmitting material such as glass in the interior of which the red luminescent material 332 (or the yellow luminescent material 332B in FIG. 4C) is disposed to be dispersed. The reflection film configured to reflect light in the wavelength range of excitation light such as light in the blue wavelength range or ultraviolet ray is formed on the first surface 101a of the transmitting wheel 431. Consequently, when light in the blue wavelength range or ultraviolet ray is shined on to the transmitting area 330D, the transmitting area 330D emits light in the red wavelength range (light in the yellow wavelength range when the transmitting area 330D contains the yellow luminescent material 332B) as excitation light.

The red light source device 403 includes further the red light emitting diode (the first light source) 121. Light in the red wavelength range emitted from the red light emitting diode 121 is collected by a collective lens group 125, is then incident on the transmitting area 330D from the side thereof that faces the first surface 101a of the transmitting wheel 431, passes through the transmitting area 330D, and is eventually emitted from the side of the transmitting area 330D that faces the second surface 101b of the transmitting wheel 431. The light in the red wavelength range from the red light emitting diode 121 that has passed through the transmitting area 330D and the light in the red wavelength range which is luminescent light excited by excitation light are emitted to the dichroic mirror 502. The light in the red wavelength range transmitted through the dichroic mirror 502 is reflected by the reflection mirror 505 and are eventually incident on the display device 513. Similar to the second modified example illustrated in FIG. 4C, the yellow luminescent material 332B may be disposed to be dispersed in the interior of the light transmitting material of the transmitting area 330D in place of the red luminescent material 332. In this case, however, the red light transmitting filter configured to transmit only light in the red wavelength range is desirably provided between the transmitting wheel 431 and the display device 513.

A dichroic prism 701 is disposed in an inner position surrounded by the display devices 511, 512, 513 from three directions. The display devices 511, 512, 513 are each made up of a liquid crystal display (LCD). A controller 38 controls the switching between a transmission of light and a cut-off of light individually at the display devices 511, 512, 513 in a time-sharing fashion for each pixel, whereby the controller 38 causes light in the blue wavelength range, light in the green wavelength range, and light in the red wavelength range to be incident on the dichroic prism 701 in a time-sharing fashion. The dichroic prism 701 reflects the light in the blue wavelength range and the light in the red wavelength range towards a collective lens 602 and transmits the light in the green wavelength range towards the collective lens 602. As a result, light that forms an image is emitted towards the collective lens 602.

The collective lens 602 collects light emitted from the dichroic prism 701 and displays a projected image on to a screen or the like, not shown. In the second embodiment, the controller 38 may cause light in the blue wavelength range, light in the green wavelength range, and light in the red wavelength range to be incident on the display devices 511, 512, 513 simultaneously to be combined together at the dichroic prism 701.

In the second embodiment, too, the transmitting area 330D can take a similar cross-sectional configuration to those of the first transmitting areas 330A to 330C described in the first to third modified examples illustrated in FIGS. 4B to 4C, respectively. In the case where the first transmitting areas 330A to 330C of the first to third modified examples to the transmitting wheel 431 of the second embodiment, the first to third transmitting areas 330A to 330C can each be formed into a ring-like configuration that extends along the full circumference of the transmitting wheel 431.

In the first embodiment, a color wheel including a color filter may be provided directly ahead of the light guiding device 175. For example, a transmitting area configured to transmit light in the blue, red, and green wavelength ranges and a red light transmitting filter can be laid out circumferentially on the color wheel. Then, the color wheel and the luminescent wheel can be driven to rotate in synchronism with each other. For example, the color wheel is driven to cause only a red component to pass through the red light transmitting filter at a timing when the luminescent wheel 101 emits light in the red wavelength range to thereby increase the purity of the color. In the case where the color wheel is provided, a configuration may be adopted in which the dichroic filters 334, 335 are not provided on the first transmitting areas 330B, 330C of the second and third modified examples.

In addition, a red laser diode may be used in place of the red light emitting diode 121. In this case, a diffuse layer is provided on the first transmitting area 330, 330A to 330C, and the transmitting area 330D, so that light in the red wavelength range can be transmitted while being diffused. Additionally, a configuration may be adopted in which a diffusing plate is provided on an optical path of light in the red wavelength range in the light guiding optical system 140.

In the light source unit 60, light in the blue wavelength range can be incident on the first transmitting area 330 of the luminescent wheel 101 from the side facing the second surface 101b with a weak output at such a timing that light in the red wavelength range is incident on the first transmitting area 330 from the side facing the first surface 101a. The intensity of the light in the blue wavelength range then can be an intensity that is weaker than the intensity of light that is shined on to the second transmitting area 320 of the luminescent wheel 101. As a result, in the light source unit 60, the luminance can be improved without reduction in color reproducibility of light in the red wavelength range that is emitted to the light source-side optical system 170.

In the luminescent wheel 101 of the first embodiment, the second transmitting area 320 may include a green luminescent material configured to emit light in the green wavelength range as luminescent light by being excited by light in the blue wavelength range in part of the interior or on part of the surface thereof. As a result, the luminescent wheel 101 can emit light in the blue wavelength range that includes light in the green wavelength range from the second transmitting area 320 towards the side facing the second surface 101b. The color reproducibility of light in the blue wavelength range can be improved by controlling the shade of light in the blue wavelength range by controlling the quantity of light in the green wavelength range contained in the second transmitting area 320. In the case where a green luminescent material is formed on the surface of the second transmitting area 320, the green luminescent material may be formed on the side facing the first surface 101a or the side facing the second surface 101b.

Thus, as has been described heretofore, the light source unit 60, 60A and the projector 10, 10A of the embodiment of the present invention include the first light source configured to emit light in the first wavelength range and the wheel (the luminescent wheel 101, 101A to 101C, the transmitting wheel 431) including the first transmitting area 330, 330A to 330C, or the transmitting area 330D that transmits light in the first wavelength range that is incident thereon from the side facing the first surface. The first transmitting area 330, 330A to 330C, or the transmitting area 330D includes the first luminescent material configured to emit the first luminescent light that includes at least a partial wavelength range of light in the first wavelength range when light in the second wavelength range whose wavelength range is different from that of light in the first wavelength range is shined from the side facing the second surface 101b of the wheels that is opposite to the first surface 101a.

As a result, since the optical path of light in the third wavelength range can be made the same as the optical paths of light in the first wavelength range and the luminescent light from the first luminescent material, light in the first wavelength range and luminescent light from the first luminescent material can be guided while reducing the loss that would be generated in separating or combining the light in the first wavelength range from or with the luminescent light, whereby the light source units 60, 60A can be formed which can emit bright light source light while ensuring the color balance as a whole.

In the light source unit 60, the first luminescent material is dispersed in the interior of the first transmitting area 330, 330B or is formed on part of the surface of the first transmitting area 330A, 330C. Thus, with this light source unit 60, when light in the second wavelength range is shined on the first transmitting area with light in the first wavelength range being caused to pass through light in the first wavelength range, luminescent light can be emitted from the first transmitting area.

In addition, the light source unit 60 includes the second light source configured to emit light in the second wavelength range, and the wheel 101, 101A to 101C includes the second transmitting area 320 provided end to end with the first transmitting area 330, 330A to 330C in the circumferential direction and configured to transmit light in the second wavelength range, and the luminescent light emitting area 310 provided end to end with the first transmitting area 330, 330A to 330C and the second transmitting area 320 and including the second luminescent material configured to emit light in the third wavelength range that is different from light in the first wavelength range and light in the second wavelength range as second luminescent light when light in the second wavelength range is shined thereon from the side facing the second surface 101b. As a result, light in the first wavelength range and light in the third wavelength range can be emitted from the wheel 101, 101A to 101C.

In the light source unit 60, the density in which the first luminescent material is disposed in the first transmitting area 330, 330A to 330C is coarser than the density in which the second luminescent material is disposed in the luminescent light emitting area, while being allowed to transmit light in the first wavelength range, the first transmitting area 330, 330A to 330C is allowed to emit first luminescent light when light in the second wavelength range is shined on thereto, and the luminescent light emitting area 310 is allowed to emit light in the third wavelength range that is brighter than the first luminescent light described above when light in the second wavelength range is shined on thereto.

In the light source unit 60, the first transmitting area 330B, 330C includes the first luminescent material configured to emit, as first luminescent light, light in the fourth wavelength range including part of light in the first wavelength range and part of light in the third wavelength range including the wavelength component that lies adjacent to or overlaps light in the first wavelength range when light in the second wavelength range is shined on thereto, whereby the quantity of light in the third wavelength range that is emitted from the wheel 101B, 101C can be increased.

In addition, the first transmitting area 330B, 330C includes the dichroic filter 334, 335 configured to cut off light in the third wavelength range on the side facing the second surface 101b. As a result, the purity of color of light in the third wavelength range can be improved.

The second transmitting area 320 is the area configured to transmit light in the second wavelength range, and the light source unit 60 includes the light guiding optical system 140 configured to combine together light in the second wavelength range that is transmitted to the side facing the first surface 101a, light in the first wavelength range that is transmitted to the side facing the second surface 101b, and light in the third wavelength range and light in the fourth wavelength range that are emitted to the side facing the second surface 101b of the luminescent wheel 101, 101A to 101C. As a result, the light rays in the multiple wavelength ranges can be emitted with the small number of light sources, so that the light rays so emitted can be combined together as light source light.

Additionally, the light guiding optical system 140 includes the first dichroic mirror 141 configured to guide light in the second wavelength range emitted from the second light source to the wheel 101, 101A to 101C, guide light in the second wavelength range emitted from the wheel 101, 101A to 101C to the side facing the first surface 101a to the combined optical path, and guide light in the second wavelength range, light in the third wavelength range, and luminescent light that are emitted from the wheel 101, 101A to 101C to the side facing the second surface 101b to the combined optical path. Since the optical paths of these light rays can be controlled according to the wavelength ranges, light rays in the multiple wavelength ranges can be combined together with the simple configuration.

The light guiding optical system 140 includes the second dichroic mirror 144 configured to guide light in the second wavelength range that has passed through the wheel 101, 101A to 101C to the first dichroic mirror 141, and light in the second wavelength range emitted from the second light source to the luminescent wheel 101, 101A to 101C. As a result, part of the optical path of light traveling from the wheel 101, 101A to 101C to the first dichroic mirror 141 and part of the optical path of light traveling from the second light source to the wheel 101, 101A to 101C can be made common for use, whereby the configuration of the light guiding optical system 140 can be simplified.

In addition, the light guiding optical system 140 includes the first reflection mirror 142 configured to guide light in the second wavelength range emitted from the first dichroic mirror 141 to the wheel 101, 101A to 101C and guide light in the second wavelength range to light in the fourth wavelength range that are emitted from the wheel 101, 101A to 101C to the first dichroic mirror 141, and includes the second reflection mirror 143 configured to guide light in the second wavelength range that has passed through the wheel 101, 101A to 101C and guide light in the second wavelength range emitted from the second dichroic mirror 144 to the wheel 101, 101A to 101C. As a result, the degree of freedom in laying out the first light source, the second light source and the luminescent wheel can be improved.

According to the light source unit 60 in which light in the first wavelength range is light in the red wavelength range, light in the second wavelength range is light in the blue wavelength range, light in the third wavelength range is light in the green wavelength range, and light in the fourth wavelength range is light in the yellow wavelength range, the light source unit configured to project a color image can be formed, and the projection modes can be switched over according to the utilization environment by giving priority to color reproducibility or brightness.

While the embodiments and modified examples of the present invention have been described heretofore, the embodiments and the modified examples are presented as examples, and hence, there is no intention to limit the scope of the present invention by these embodiments and modified examples. These novel embodiments can be carried out in other various forms, and various omissions, replacements and modifications can be made to the embodiments without departing from the spirit and scope of the present invention. Those resulting embodiments and their modifications are included in the spirit and scope of the present invention and are also included in the scope of inventions claimed for patent under claims below and their equivalents.

What is claimed is:

1. A light source unit comprising:
   a first light source configured to emit light in a first wavelength range; and
   a wheel in which a first transmitting area is formed, the first transmitting area being configured to transmit light in the first wavelength range incident from a side facing a first surface,
   wherein the first transmitting area contains a first luminescent material configured to emit first luminescent light including at least a partial wavelength range of light in the first wavelength range by light in a second wavelength range whose wavelength range differs from that of light in the first wavelength range being shined from a side facing a second surface of the wheel, the second surface being opposite to the first surface,
   wherein the wheel comprises:
   a second transmitting area provided circumferentially end to end with the first transmitting area and configured to transmit light in the second wavelength range; and
   a luminescent light emitting area provided end to end with the first transmitting area and the second transmitting area and including a second luminescent material formed thereon, the second luminescent material being configured to emit, as second luminescent light, light in a third wavelength range that differs from light in the first wavelength range and light in the second wavelength range by being shined with light in the second wavelength range from the second surface side.

2. The light source unit according to claim 1,
   wherein a reflection film is formed on the side of the first transmitting area that faces the first surface of the wheel, the reflection film being configured to reflect light in the second wavelength range.

3. The light source unit according to claim 2,
   wherein the first luminescent material is dispersed in an interior of the first transmitting area or at a portion of a surface of the first transmitting area.

4. The light source unit according to claim 3,
   wherein the wheel comprises:
   a second transmitting area provided circumferentially end to end with the first transmitting area and configured to transmit light in the second wavelength range; and
   a luminescent light emitting area provided end to end with the first transmitting area and the second transmitting area and including a second luminescent material formed thereon, the second luminescent material being configured to emit, as second luminescent light, light in a third wavelength range that differs from light in the first wavelength range and light in the second wavelength range by being shined with light in the second wavelength range from the second surface side.

5. The light source unit according to claim 2,
wherein the wheel comprises:
a second transmitting area provided circumferentially end to end with the first transmitting area and configured to transmit light in the second wavelength range; and
a luminescent light emitting area provided end to end with the first transmitting area and the second transmitting area and including a second luminescent material formed thereon, the second luminescent material being configured to emit, as second luminescent light, light in a third wavelength range that differs from light in the first wavelength range and light in the second wavelength range by being shined with light in the second wavelength range from the second surface side.

6. The light source unit according to claim 1,
wherein the first luminescent material is dispersed in an interior of the first transmitting area or at a portion of a surface of the first transmitting area.

7. The light source unit according to claim 6,
wherein the wheel comprises:
a second transmitting area provided circumferentially end to end with the first transmitting area and configured to transmit light in the second wavelength range; and
a luminescent light emitting area provided end to end with the first transmitting area and the second transmitting area and including a second luminescent material formed thereon, the second luminescent material being configured to emit, as second luminescent light, light in a third wavelength range that differs from light in the first wavelength range and light in the second wavelength range by being shined with light in the second wavelength range from the second surface side.

8. The light source unit according to claim 1, comprising:
a second light source configured to emit light in the second wavelength range.

9. The light source unit according to claim 8,
wherein a density in which the first luminescent material is disposed in the first transmitting area is smaller than a density in which the second luminescent material is disposed in the luminescent light emitting area.

10. The light source unit according to claim 8,
wherein the first transmitting area contains the first luminescent material configured to emit, as the first luminescent light, light in a fourth wavelength range that includes part of light in the first wavelength range and part of light in the third wavelength range including a wavelength component lying adjacent to or overlapping light in the first wavelength range as a result of light in the second wavelength range being shined on to the first luminescent material.

11. The light source unit according to claim 10,
wherein the first transmitting area comprises a dichroic filter provided on the side facing the second surface side, the dichroic filter being configured to cut off light in the third wavelength range.

12. The light source unit according to claim 10,
wherein the second transmitting area constitutes an area configured to transmit light in the second wavelength range.

13. The light source unit according to claim 12, comprising:
a light guiding optical system configured to combine together light in the second wavelength range transmitted to the side facing the first surface of the wheel, light in the first wavelength range transmitted to the side facing the second surface, and light in the third wavelength and the first luminescent light both emitted to the side facing the second surface.

14. The light source unit according to claim 12,
wherein the light guiding optical system comprises:
a first dichroic mirror configured to guide light in the second wavelength range emitted from the second light source to the wheel, guide light in the second wavelength range emitted from the wheel to the side facing the first surface to a combined optical path, and guide light in the first wavelength range, light in the third wavelength range and the first luminescent light that are emitted from the wheel to the side facing the second surface to the combined optical path.

15. The light source unit according to claim 14,
wherein the light guiding optical system comprises:
a second dichroic mirror configured to guide light in the second wavelength range transmitted through the wheel to the first dichroic mirror and guide light in the second wavelength range emitted from the second light source to the wheel.

16. The light source unit according to claim 15,
wherein the light guiding optical system comprises:
a first reflection mirror configured to guide light in the second wavelength range emitted from the first dichroic mirror to the wheel and guide light in the first wavelength range, light in the third wavelength range, and the first luminescent light that are emitted from the wheel to the first dichroic mirror.

17. The light source unit according to claim 16,
the light guiding optical system comprises:
a second reflection mirror configured to guide light in the second wavelength range transmitted through the wheel to the second dichroic mirror and guide light in the first wavelength range emitted from the second dichroic mirror to the wheel.

18. The light source unit according to claim 10,
wherein light in the first wavelength range constitutes light of a wavelength in a red wavelength range;
wherein light in the second wavelength range constitutes light of a wavelength in a blue wavelength range;
wherein light in the third wavelength range constitutes light of a wavelength in a green wavelength range, and
wherein light in the fourth wavelength range constitutes light of a wavelength in a yellow wavelength range.

19. A projector comprising:
the light source according to claim 1;
a display device on to which light source light from the light source unit is shined to form image light;
a projection-side optical system configured to project the image light emitted from the display device on to a screen; and
a control unit configured to control the display device and the light source unit.

20. A light source unit comprising:
a first light source configured to emit light in a first wavelength range; and
a wheel in which a first transmitting area is formed, the first transmitting area being configured to transmit light in the first wavelength range incident from a side facing a first surface,
wherein the first transmitting area contains a first luminescent material configured to emit first luminescent light including at least a partial wavelength range of light in the first wavelength range by light in a second wavelength range whose wavelength range differs from that of light in the first wavelength range being shined from a side facing a second surface of the wheel, the second surface being opposite to the first surface, wherein a reflection film is formed on the side of the first transmitting area that faces the first surface of the wheel, the reflection film being configured to reflect light in the second wavelength range, wherein the first luminescent material is dispersed in an interior of the first transmitting area or at a portion of a surface of the first transmitting area, wherein the wheel comprises:

a second transmitting area provided circumferentially end to end with the first transmitting area and configured to transmit light in the second wavelength range; and a luminescent light emitting area provided end to end with the first transmitting area and the second transmitting area and including a second luminescent material formed thereon, the second luminescent material being configured to emit, as second luminescent light, light in a third wavelength range that differs from light in the first wavelength range and light in the second wavelength range by being shined with light in the second wavelength range from the second surface side.

21. A light source unit comprising:

a first light source configured to emit light in a first wavelength range; and a wheel in which a first transmitting area is formed, the first transmitting area being configured to transmit light in the first wavelength range incident from a side facing a first surface, wherein the first transmitting area contains a first luminescent material configured to emit first luminescent light including at least a partial wavelength range of light in the first wavelength range by light in a second wavelength range whose wavelength range differs from that of light in the first wavelength range being shined from a side facing a second surface of the wheel, the second surface being opposite to the first surface, wherein the first luminescent material is dispersed in an interior of the first transmitting area or at a portion of a surface of the first transmitting area, wherein the wheel comprises:

a second transmitting area provided circumferentially end to end with the first transmitting area and configured to transmit light in the second wavelength range; and a luminescent light emitting area provided end to end with the first transmitting area and the second transmitting area and including a second luminescent material formed thereon, the second luminescent material being configured to emit, as second luminescent light, light in a third wavelength range that differs from light in the first wavelength range and light in the second wavelength range by being shined with light in the second wavelength range from the second surface side.

22. A light source unit comprising:

a first light source configured to emit light in a first wavelength range;

a second light source configured to emit light in a second wavelength range whose wavelength range differs from that of light in the first wavelength range; and a wheel in which a first transmitting area is formed, the first transmitting area being configured to transmit light in the first wavelength range incident from a side facing a first surface, wherein the first transmitting area contains a first luminescent material configured to emit first luminescent light including at least a partial wavelength range of light in the first wavelength range by light in a second wavelength range being shined from a side facing a second surface of the wheel, the second surface being opposite to the first surface, wherein the first transmitting area contains the first luminescent material configured to emit, as the first luminescent light, light in a fourth wavelength range that includes part of light in the first wavelength range and part of light in the third wavelength range including a wavelength component lying adjacent to or overlapping light in the first wavelength range as a result of light in the second wavelength range being shined on to the first luminescent material.

23. A light source unit comprising:

a first light source configured to emit light in a first wavelength range;

a wheel in which a first transmitting area is formed, the first transmitting area being configured to transmit light in the first wavelength range incident from a side facing a first surface; and a second light source configured to emit light in a second wavelength range whose wavelength range differs from that of light in the first wavelength range, wherein the first transmitting area contains a first luminescent material configured to emit first luminescent light including at least a partial wavelength range of light in the first wavelength range by light in a second wavelength range being shined from a side facing a second surface of the wheel, the second surface being opposite to the first surface, wherein the wheel comprises a luminescent light emitting area provided end to end with the first transmitting area and including a second luminescent material formed thereon, the second luminescent material being configured to emit, as second luminescent light, light in a third wavelength range that differs from light in the first wavelength range and light in the second wavelength range by being shined with light in the second wavelength range from the second surface side, and wherein a density in which the first luminescent material is disposed in the first transmitting area is smaller than a density in which the second luminescent material is disposed in the luminescent light emitting area.

24. A light source unit comprising:

a first light source configured to emit light in a first wavelength range;

a wheel in which a first transmitting area is formed, the wheel having opposite first and second surfaces that face in opposite directions from each other, the first transmitting area being configured to transmit light in the first wavelength range incident from a first side facing the first surface; and a second light source configured to emit light in a second wavelength range whose wavelength range differs from that of light in the first wavelength range, wherein the first transmitting area contains a first luminescent material configured to emit first luminescent light including at least a partial wavelength range of light in the first wavelength range by light in the second wavelength range being shined from a second side facing the second surface of the wheel, wherein the first light source is disposed on the first side facing the first surface of the wheel, and the second light source is disposed on the second side facing the second surface of the wheel, and wherein the wheel rotates in a plane so that the first and second sides are separated by the plane.

\* \* \* \* \*